United States Patent [19]

Robertson

[11] 4,114,332

[45] Sep. 19, 1978

[54] ANCHORING SYSTEM FOR PRESTRESSED CONCRETE PIPE

[75] Inventor: Harry H. Robertson, San Pedro, Calif.

[73] Assignee: Ameron, Inc., Monterey Park, Calif.

[21] Appl. No.: 791,296

[22] Filed: Apr. 27, 1977

[51] Int. Cl.² ............................................. F16L 9/00
[52] U.S. Cl. ...................................... 52/224; 138/176
[58] Field of Search .................. 52/224, 223 R, 223 L; 138/176

[56] References Cited

U.S. PATENT DOCUMENTS

| | | | |
|---|---|---|---|
| 2,887,130 | 5/1959 | Kell | 52/224 X |
| 3,110,503 | 11/1963 | Hubbard | 52/224 X |
| 3,258,033 | 6/1966 | Ohnstad | 52/224 X |
| 3,275,040 | 9/1966 | Hausmann et al. | 138/176 |
| 3,278,128 | 10/1966 | Szulc | 52/224 X |
| 3,338,601 | 8/1967 | Osweiler | 138/176 X |
| 3,504,474 | 4/1970 | Dykmans | 138/176 X |
| 3,521,644 | 7/1970 | Lamborn | 52/224 X |
| 3,642,033 | 2/1972 | Bald | 138/176 |

*Primary Examiner*—J. Karl Bell
*Attorney, Agent, or Firm*—Christie, Parker & Hale

[57] ABSTRACT

Multilayers of high tensile strength wire are wound in tension around a tubular concrete core, and anchored to place the pipe in radial compression. The first layer of wire wrapped around the pipe is secured at its opposite end by a first anchoring system, and is coated with mortar. Each successive layer of wire wrapped around the pipe is secured to its opposite ends by respective separate anchors, and is covered by a respective coating of mortar. Each anchoring system after the first includes an insert block in an embedment anchor for supporting a separate anchor block for each layer of wire at a level different from that of the preceding layers of wire. Each insert block is contacted by the first wire to hold the insert blocks in place, and to provide electrical continuity for cathodic protection, when required.

6 Claims, 5 Drawing Figures

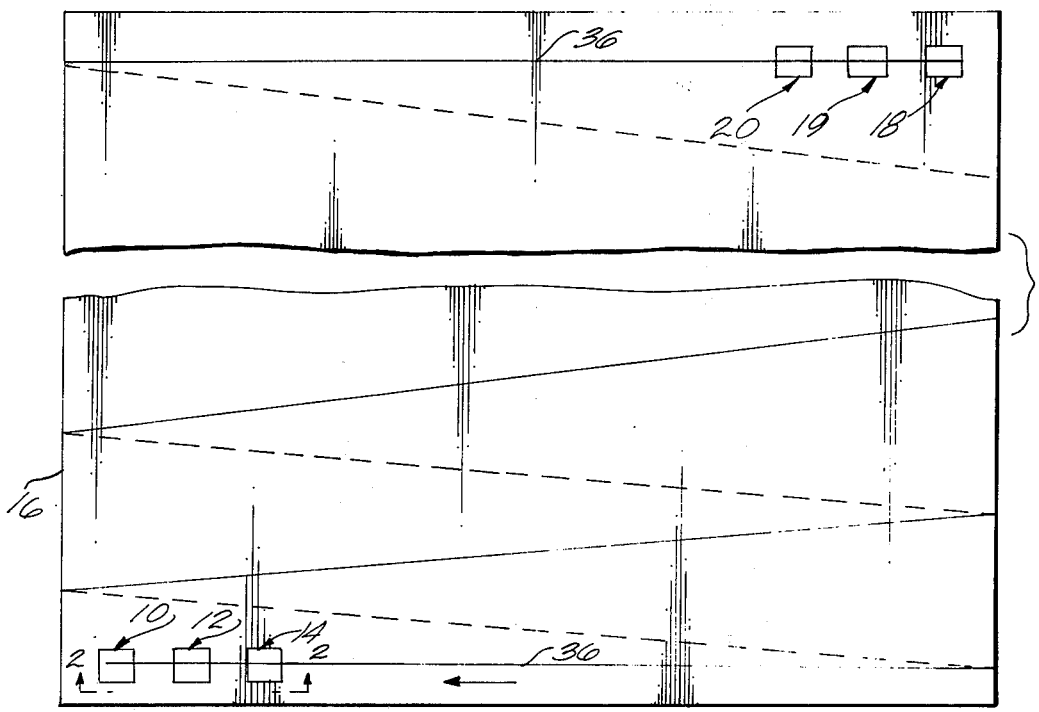
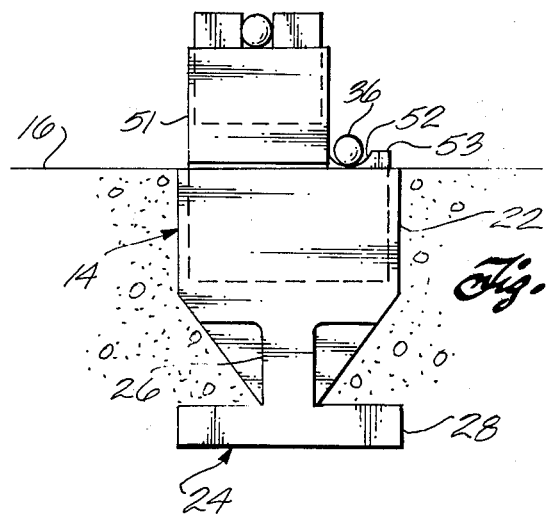

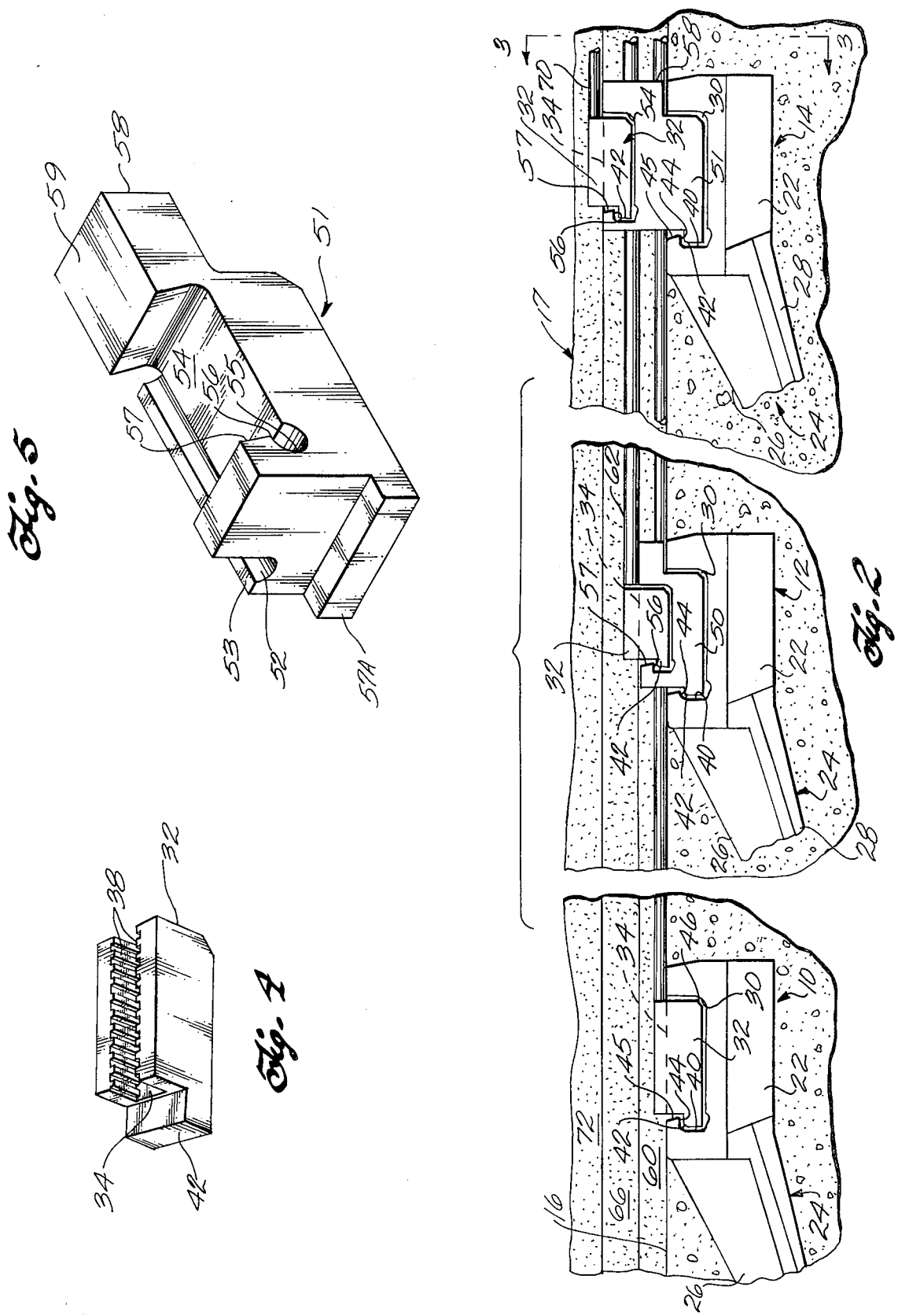

ANCHORING SYSTEM FOR PRESTRESSED CONCRETE PIPE

BACKGROUND OF THE INVENTION

1. Field of the Invention

This invention relates to anchoring systems for high tensile strength steel wire wrapped in tension around a core of a concrete pipe to prestress the pipe in radial compression, thereby enabling it to withstand substantial internal fluid pressure without failing.

2. Description of the Prior Art

U.S. Pat. No. 3,278,128 (issued Oct. 11, 1966 to Szulc) describes one type of prestressed concrete pipe made before this invention. U.S. Pat. No. 3,258,033 (issued June 28, 1966 to Ohnstad) discloses a prior art anchoring system used for prestressing wire in concrete pipe.

In the Szulc patent referred to above, a first prestressing wire was wrapped in tension around concrete pipe to form a helix with fairly wide spacing between adjacent turns. The first wire was secured at its opposite ends to embedment anchors cast in the concrete pipe to keep the pipe in radial compression. Thereafter, a second wire was wrapped in tension around the pipe between adjacent turns of the first wire, and the second wire was anchored at its opposite ends to keep additional compressive force on the pipe. Later, the practice was developed in which the first wire was wrapped around a tubular concrete pipe core with more closely spaced adjacent turns in the helix. The first wire was covered with a first layer of mortar, which was cured. Thereafter, the second wire was wrapped around the first layer of mortar in the form of a helix with adjacent turns also spaced fairly closely together. The second wire was coated with a second layer of mortar, which was cured. This procedure could be repeated as many times as necessary for the particular job involved, but, as explained below, two wrappings of wires were usually the practical maximum number.

It was the prior art practice to place the embedment anchors for the prestressing wires flush with the outside diameter of the pipe core. The embedment anchors had outwardly opening recesses which were temporarily filled with removable rubber plugs to keep the recesses from filling with concrete when the pipe core was cast. After the pipe core cured, the rubber plugs were removed from the two embedment anchors for the first prestressing wire, and anchor blocks were inserted in the recesses. The first wire was wrapped and coated with the first layer of mortar. After the mortar cured, it was manually cut or sculptured to form inclines in the first mortar coating down to the level of the embedment anchors in the pipe core for the second prestressing wire. The rubber plugs were removed and replaced with anchor blocks. The second wire and second mortar coating was then applied.

This procedure, although time-consuming and dependent on the craftmanship of the worker making the pipe, is satisfactory when only two layers of prestressing wire are required. However, when additional layers of prestressing wire are needed, the ramps or inclines cut in the mortar coatings become excessively long and difficult to make. The cuts are especially difficult to make at the top of the pipe, which often is 20 feet or more above ground. Moreover, the quality of the pipe depends on the ability of the workman to cut a smooth, gradual ramp that will not introduce wire lift-out forces at the anchor block, or cause undue stress concentrations in the wire. The wires were also electrically insulated from each other, making it difficult to apply cathodic protection, when needed.

SUMMARY OF THE INVENTION

This invention avoids cutting or sculpturing inclines in a preceding mortar coating when an additional layer of prestressing wire is applied to a concrete pipe, and it provides electrical continuity between all prestressing wires to facilitate cathodic protection.

The anchor system of this invention includes an embedment anchor having a recess in it. The embodiment anchor is adapted to be cast in a tubular concrete pipe core so that the surface of the embedment anchor with the recess is flush with the outer surface of the pipe core. An insert block is disposed in the embedment anchor recess and projects outwardly from the embedment anchor. The insert block has a recess in it to receive an anchor block which has means for receiving a wire to be anchored at the level established by the size of the insert block and anchor block.

Preferably, the insert block includes a groove to receive another wire previously secured at a lower level (i.e., closer to the longitudinal axis of the pipe) and wrapped in tension with conventional anchoring means.

When the anchoring system of this invention is installed, it provides a prestressed concrete pipe which includes a tubular concrete core having a longitudinal axis. First and second embedment anchors are embedded in the concrete core, and means are provided for securing a first wire to the first embedment anchor. The second embedment anchor has a recess in it, and an insert block is disposed in the second embedment anchor recess to project from the second embedment. An anchor block is in the insert block recess, and a first wire secured to the first embedment anchor and wrapped around the concrete core contacts and overlies the insert block to hold it in place during the wrapping operation. A first layer of mortar covers the concrete body and the first wire. A second wire secured to the anchor block in the insert block in the second embedment anchor recess is wrapped in tension around the first layer of mortar covering the first wire. Preferably, a second layer of mortar is applied over the second wire to protect it from corrosion. If desired, additional embedment anchors may be used similar to the second embedment anchor to provide as many additional layers of prestressing wire as required. In each case, the insert block holds the anchor block so the wire being wrapped starts on top of the mortar coating previously applied to the pipe core.

BRIEF DESCRIPTION OF THE DRAWING

FIG. 1 is a fragmentary elevation of a concrete pipe core with three embedment anchors cast in each end of the core;

FIG. 2 is a view taken on line 2—2 of FIG. 1;

FIG. 3 is a view taken on line 3—3 of FIG. 2;

FIG. 4 is a perspective view of an anchor block; and

FIG. 5 is a perspective view of the insert block of this invention.

DESCRIPTION OF THE PREFERRED EMBODIMENTS

Referring to FIG. 1, first, second and third embedment anchors 10, 12 and 14, respectively, are embedded in the lower end and outer surface of an upright concrete tubular pipe core 16 from which a complete prestressed pipe 17 (shown fragmentarily in FIG. 2) is to be made. Fourth, Fifth and Sixth embedment anchors 18, 19 and 20, respectively, are cast in the outer surface of the upper end of the pipe core. Each of the embedment anchors may be of conventional type, and may be secured in place during the casting of the concrete pipe core by any suitable means, such as that disclosed in U.S. Pat. No. 3,258,033 to Ohnstad.

As shown best in FIGS. 2 and 3, each of the embedment anchors includes a rectangular body 22 with a longitudinally and inwardly extending arm 24 with a radially extending web 26 and a flange 28 to provide firm interlocking between the cast concrete core and the embedment anchor. A longitudinally extending recess 30 extends through each embedment anchor and opens out of the embedment anchor outer surface, which is flush with the outer surface of the pipe core.

An anchor block 32 in the recess of the first embedment anchor includes a transversely extending groove 34 in which the starting end of a first prestressing wire 36 is gripped by opposing radially extending teeth 38 (FIG. 4) when a wire is driven down into the groove 34.

A first prestressing wire 36 is wrapped around the pipe core with conventional equipment, such as that shown in U.S. Pat. No. 3,278,128 to Szulc. The pipe core rests in an upright position on a motor-driven turntable (not shown), which rotates about a vertical axis collinear with the longitudinal axis of the pipe core. In the wrapping process, the starting end of the first wire 36 is driven into the groove in the anchor block in the first embedment anchor, and the wire is wrapped about the pipe core as the core is rotated in a clockwise direction (viewed from above in FIG. 1). The wire is fed from a feed arm (not shown) which moves longitudinally up the pipe to cause helical turns of wire to be wrapped around the pipe core. The details of the wrapping apparatus are not shown because they do not form any part of the invention, and are well known in the art. The pipe core may or may not contain a reinforcing steel cylinder or wire cage (not shown), which may be conventional.

The forward (left as viewed in FIG. 2) end of recess 30 in each anchor embedment has a longitudinally extending undercut 40 into which a toe 42 on the forward end of the anchor block fits so as to lie under a ledge 44 over the undercut 40. Thus, the anchor block is locked in the recess in the first embedment anchor. The radially extending surface 45 over the ledge diverges outwardly from the embedment anchor recess, and the "heel" or rear inner edge of the anchor block is beveled at 46 to facilitate the insertion of the anchor block after the forms are removed from the pipe core and rubber plugs (not shown) are removed from the recesses 30 in each of the first embedment anchors. (The rubber plugs are conventional, and were placed in the recesses before casting the pipe core to keep concrete out of the recesses.)

In starting the application of the first prestressing wire, the pipe core is turned slowly from right to left (as viewed in FIG. 2), and as indicated by the arrow at the bottom of FIG. 1. An intermediate size insert block 50 is inserted in the recess 30 of the second embedment anchor, and a full size insert block 51 (FIGS. 3 and 5) is inserted in the recess 30 of the third embedment anchor. The insert blocks are virtually identical in shape, but the full size block projects radially outwardly farther than the intermediate size insert block.

A transversely extending groove 52 (shown best in FIGS. 3 and 5) in a shoulder 53 on each insert block receives the first coil of the first prestressed wire, which holds the insert blocks in their respective embedment anchors as the first wire is wrapped around the pipe core. The floor of groove 52 is flush with the outer surface of the pipe core.

Each insert block includes a longitudinally extending recess 54 similar to that recess in the embedment anchor. Each recess 54 includes an undercut 55 at its forward end to receive the toe 42 of the anchor block, and to form a ledge 56. The radially extending surface 57 over the ledge diverges outwardly from the insert block recess. A forwardly extending toe 57A fits into the undercut 40 of the embedment anchor recess 30. A rearwardly extending step 58 across the rear (right hand, as viewed in FIGS. 2 and 5) end of the insert block rests on the outer surface of the embedment anchor to resist the moment applied to the insert block when the anchor block it supports is secured to a prestressing wire. The top surface 59 of the step supports that portion of the wire adjacent the anchor block to minimize tilting forces on the anchor and insert blocks. At this stage of the operation, each recess 54 in each insert block is filled with a removable rubber plug (not shown) of the type described in U.S. Pat. No. 3,258,033 to Ohnstad.

As the pipe core is turned, it is sprayed with mortar just ahead of the point where the first prestressing wire contacts the pipe core. The rubber plugs in the insert blocks prevent the recesses 54 from filling with mortar, which is applied to form a first mortar coating layer 60 to cover the first prestressing wire to a depth at least equal to the wire diameter. The upper or final end of the first prestressing wire is anchored in the fourth embedment anchor 18 after it has been laid in the respective grooves 52 in the insert blocks in the fifth and sixth embedment anchors cast in the upper end of the pipe core exactly as described for the first three embedment anchors at the lower end of the core.

After the first mortar coating has been fully applied and cured, the rubber plug (not shown) is removed from the intermediate size insert block in the second embedment anchor, and replaced with an anchor block 32, such as that shown in FIG. 4. As shown best in FIG. 2, the floor of the transverse retaining groove 34 in the second anchor block is substantially flush with the outer surface of the first mortar coating. The starting end of a second prestressing wire 60 is driven into the retaining groove 34 of the second anchor block, and the pipe is rotated to wrap the second wire in tension around the first mortar coating. Simultaneously, fresh mortar is sprayed onto the second prestressing wire, which is finally secured at its upper end in an anchor block (not shown) mounted in the insert block (not shown) in the fifth embedment anchor 19 at the upper end of the pipe core. At this stage, the pipe is now covered with a second mortar coating 66 (FIG. 2). After the second mortar coating has fully cured, the rubber plug (not shown) is moved from the recess 54 in the third embedment anchor and replaced with a third anchor block 32, which is identical with those previously described. The starting end of a third prestressing wire 70 is driven into the groove 34 of the third anchor block so the third wire rests on the outer surface of the second mortar coating. The third prestressing wire is wrapped around the pipe, and a third mortar coating 72 is applied as previously described. The upper end of the third prestressing wire 70 is secured in an anchor block (not shown) mounted in an insert block (not shown) in the sixth embedment anchor 20 at the upper end of the pipe core. The third mortar coating is applied to the final thickness, and cured. The pipe is now ready for use.

From the foregoing description, it will be clear that the insert blocks of this invention make it possible to apply any number of layers of prestressing wire and mortar coating to a pipe core without requiring time-consuming and expensive hand labor to cut ramps or inclines in the mortar to provide access for the various wires to their respective embedment anchors. Moreover, the various layers of prestressing wire are all electrically connected because each insert block is in contact with the first prestressing wire. This facilitates the application of cathodic protection, if desired.

I claim:

1. An anchor system for wire, the system comprising:
   an embedment anchor having a recess in it,
   an insert block disposed in the embedment anchor recess and projecting from the embedment anchor, the insert block having a recess in it, and
   an anchor block disposed in the insert block recess, the anchor block having a recess in it for receiving the wire to be anchored, and the insert block having a groove in it to receive another wire which is secured by a different anchoring system.

2. An anchor system for wire, the system comprising:
   an embedment anchor having a recess in it,
   an insert block disposed in the embedment anchor recess and projecting from the embedment anchor, the insert block having a recess in it, the insert block including a projection which extends transversely to the direction from which the insert block projects from the embedment anchor to provide an overhang on the insert block to rest on the embedment anchor surface adjacent the recess in the embedment anchor, and
   an anchor block disposed in the insert block recess, the anchor block having a recess in it for receiving the wire to be anchored.

3. An anchor system according to claim 2 in which the embedment anchor recess includes an undercut cavity, and the insert block includes a toe portion which extends into the undercut cavity.

4. An anchor system according to claim 3 in which the embedment anchor recess diverges over the toe portion of the insert block to facilitate insertion and removal of the insert block in and from the embedment anchor recess.

5. A prestressed concrete pipe comprising a tubular concrete body having a longitudinal axis,
   first and second embedment anchors embedded in the concrete body, the second embedment anchor having a recess in it,
   means for securing a first wire to the first embedment anchor,
   an insert block disposed in the second embedment anchor recess and projecting from the second embedment,
   an anchor block in the insert block recess, the insert block and the anchor block being farther from the longitudinal axis than the first embedment anchor,
   a first prestressing wire secured to the first embedment anchor and wrapped in tension around the concrete body to contact and overlie a portion of the insert block, and
   a second prestressing wire secured to the anchor block and wrapped in tension around the concrete body at a distance farther from the longitudinal axis than the first prestressing wire.

6. A prestressed concrete pipe according to claim 5 in which the first wire and second wire are separated by a layer of mortar.

* * * * *

UNITED STATES PATENT AND TRADEMARK OFFICE
CERTIFICATE OF CORRECTION

PATENT NO. : 4,114,332
DATED : September 19, 1978
INVENTOR(S) : HARRY H. ROBERTSON It is certified that error appears in the above-identified patent and that said Letters Patent are hereby corrected as shown below:

Abstract, line 7, "to" should read --at--

Col. 2, line 12, "embodiment" should read --embedment--

Signed and Sealed this

Thirteenth Day of March 1979

[SEAL]

Attest:

RUTH C. MASON
Attesting Officer

DONALD W. BANNER
Commissioner of Patents and Trademarks